(12) United States Patent
John et al.

(10) Patent No.: US 9,402,104 B2
(45) Date of Patent: Jul. 26, 2016

(54) SYSTEM AND METHOD FOR SUBSCRIBING TO EVENTS BASED ON TAG WORDS

(75) Inventors: Ajita John, Holmdel, NJ (US); Shreeharsh Kelkar, Summit, NJ (US); Doree Duncan Seligmann, New York, NY (US)

(73) Assignee: Avaya Inc., Basking Ridge, NJ (US)

( * ) Notice: Subject to any disclaimer, the term of this patent is extended or adjusted under 35 U.S.C. 154(b) by 609 days.

(21) Appl. No.: 12/847,992

(22) Filed: Jul. 30, 2010

(65) Prior Publication Data
US 2012/0030292 A1 Feb. 2, 2012

(51) Int. Cl.
| | |
|---|---|
| G06F 15/16 | (2006.01) |
| H04N 21/475 | (2011.01) |
| G06F 17/30 | (2006.01) |
| H04N 21/258 | (2011.01) |
| H04N 21/472 | (2011.01) |
| H04N 21/488 | (2011.01) |
| H04N 21/845 | (2011.01) |
| H04N 21/858 | (2011.01) |
| G06Q 30/00 | (2012.01) |
| G06Q 30/02 | (2012.01) |
| H04H 60/73 | (2008.01) |
| H04H 60/80 | (2008.01) |
| H04H 60/46 | (2008.01) |

(52) U.S. Cl.
CPC ...... *H04N 21/4755* (2013.01); *G06F 17/30023* (2013.01); *G06Q 30/00* (2013.01); *G06Q 30/02* (2013.01); *H04H 60/73* (2013.01); *H04H 60/80* (2013.01); *H04N 21/25891* (2013.01); *H04N 21/47214* (2013.01); *H04N 21/4882* (2013.01); *H04N 21/8456* (2013.01); *H04N 21/858* (2013.01); *H04H 60/46* (2013.01); *H04H 2201/37* (2013.01)

(58) Field of Classification Search
USPC .......................................................... 709/206
See application file for complete search history.

(56) References Cited

U.S. PATENT DOCUMENTS

| | | | |
|---|---|---|---|
| 7,876,352 B2 * | 1/2011 | Martin | G06F 17/30247 348/143 |
| 8,424,052 B2 * | 4/2013 | Abed | 725/136 |
| 8,731,458 B2 * | 5/2014 | Sullivan | 455/3.03 |
| 2008/0010294 A1 | 1/2008 | Norton et al. | |
| 2008/0104172 A1 * | 5/2008 | Craig | H04L 67/306 709/204 |
| 2008/0162510 A1 * | 7/2008 | Baio et al. | 707/100 |
| 2008/0320159 A1 * | 12/2008 | Naimark et al. | 709/231 |

(Continued)

FOREIGN PATENT DOCUMENTS

EP 1818930 8/2007

*Primary Examiner* — Ryan Jakovac
(74) *Attorney, Agent, or Firm* — Sheridan Ross P.C.

(57) ABSTRACT

Disclosed herein are systems, methods, and non-transitory computer-readable storage media for creating tag subscriptions and notifying users based on tag subscriptions. A system configured to create tag subscriptions receives from a user, as part of a tag subscription request, a tag, a selection of at least one media event to which the tag is to be applied, and a notification threshold. The system then establishes a tag subscription associated with the user based on the tag, the selection of at least one media event, and the notification threshold. A system configured to generate tag notifications based on a tag subscription retrieves a tag subscription including a tag, a selection of a media event, and a notification threshold. The system then monitors tags generated in association with the media event for matches with the tag, and sends a tag notification to a user when matches exceed the notification threshold.

19 Claims, 7 Drawing Sheets

(56) References Cited

U.S. PATENT DOCUMENTS

| | | | | |
|---|---|---|---|---|
| 2009/0210351 A1* | 8/2009 | Bush | G06Q 50/188 705/80 |
| 2009/0286605 A1* | 11/2009 | Hamilton et al. | 463/42 |
| 2010/0129065 A1* | 5/2010 | Porter et al. | 386/124 |
| 2010/0274673 A1* | 10/2010 | Isaac | 705/14.73 |
| 2011/0066949 A1* | 3/2011 | DeLuca | G06Q 10/10 715/744 |
| 2011/0145581 A1* | 6/2011 | Malhotra et al. | 713/171 |
| 2011/0246937 A1* | 10/2011 | Roberts et al. | 715/810 |
| 2011/0314485 A1 | 12/2011 | Abed | |
| 2012/0101806 A1* | 4/2012 | Davis et al. | 704/9 |

\* cited by examiner

FIG. 3

TAG SUBSCRIPTION REQUEST FORM — 300

TAGS TO SUBSCRIBE TO: "WILL IT FLOAT" — 302

MEDIA EVENT(s) TO SUBSCRIBE TO: THE LATE SHOW WITH DAVID LETTERMAN — 304

WHO RECEIVES NOTIFICATION? 414-143-4141; amg@mail.com — 306

WHEN TO NOTIFY? [X] IN REAL TIME — 308
[ ] PERIODICALLY — 310

THRESHOLD FOR NOTIFICATION: 0 —|— 100 — 312

THRESHOLD ATTRIBUTE: ▷ — 314

FUZZY MATCH TAG? ⦿ YES  ○ NO — 316

SUBMIT — 318

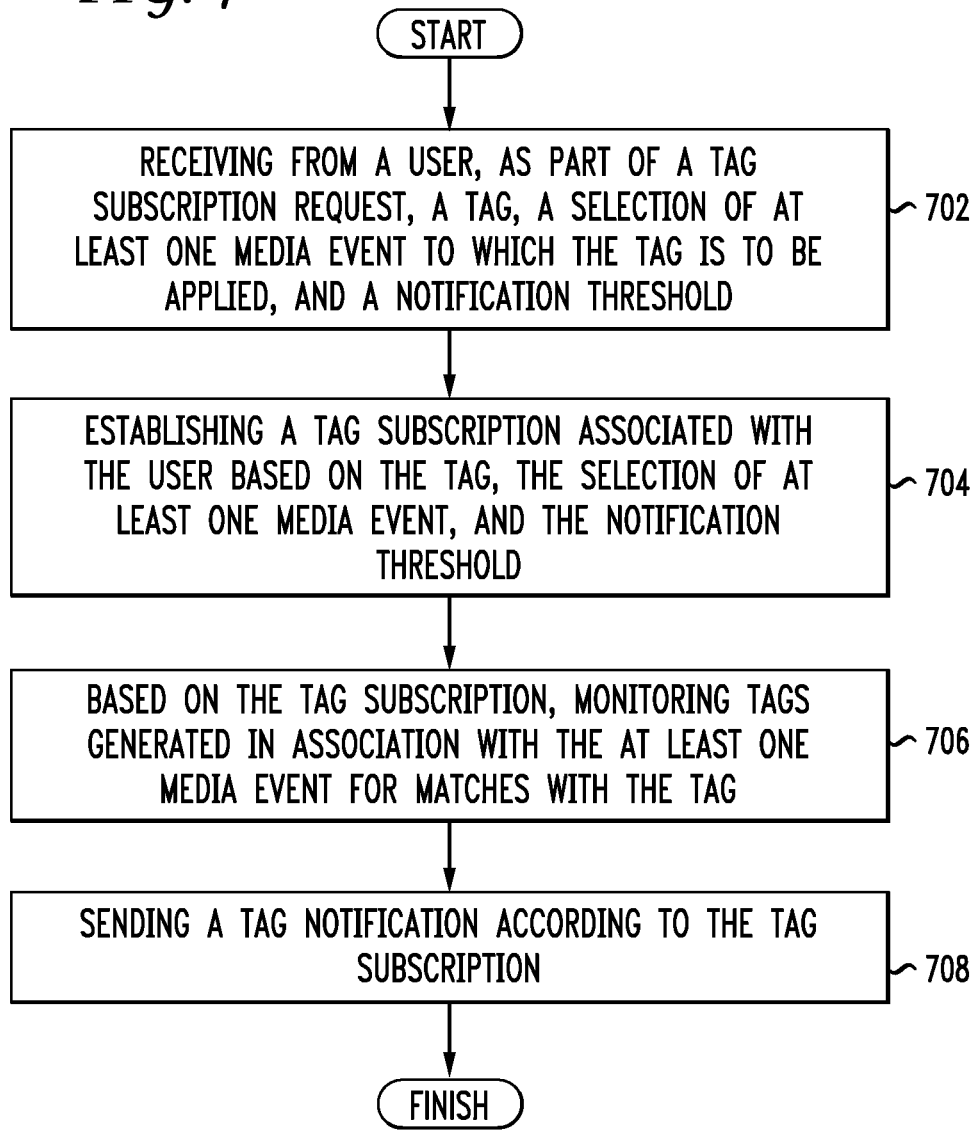

SYSTEM AND METHOD FOR SUBSCRIBING TO EVENTS BASED ON TAG WORDS

BACKGROUND

1. Technical Field

The present disclosure relates to tags of media events and more specifically to tag subscriptions and notifications based on tag subscriptions.

2. Introduction

Users who watch, listen to, or participate in a media event can provide tags for the media event. Some example media events include television broadcasts, teleconferences or video conferences, a live event, and so forth. For example, during a soccer match, a user tags parts of the event with tags such as "goal", "yellow card", or "offside". Often many users are simultaneously tagging a particular event.

However, the deluge of tags can be overwhelming. Sorting through the tags to find relevant or interesting trends or information is a tedious chore. A tag or group of tags of interest to a particular user are virtually impossible to easily and quickly locate. Further, users must actively seek out and sort tags from potentially multiple sources and media events in order to find relevant tags.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for establishing a tag subscription and for generating notifications based on a tag subscription. The method for establishing a tag subscription includes receiving from a user, as part of a tag subscription request, a tag, a selection of at least one media event to which the tag is to be applied, and a notification threshold, and establishing a tag subscription associated with the user based on the tag, the selection of at least one media event, and the notification threshold. The tag subscription request can include additional parameters associated with the tag subscription, such as a notification frequency, a notification modality, and a list of parties to receive the notifications.

The method for generating notifications based on a tag subscription includes retrieving a tag subscription having a tag, a selection of a media event, and a notification threshold, monitoring tags generated in association with the media event for matches with the tag, and sending a tag notification when matches with the tag exceed the notification threshold. The tag subscription can be created by the user associated with the tag subscription or by a third party. The tags can originate from multiple sources, including human taggers and automated taggers. The notification can include a timestamp indicating when, in relation to a recorded media event, the matches exceeded the notification threshold.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates an example tag subscription request form;

FIG. 7 illustrates an example method embodiment for establishing a tag subscription and sending a tag notification based on the tag subscription.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved identification of relevant tags, notifying users of the relevant tags, and integrating those tags with the media event. Tags can include text annotations, tweets, audio annotations, comments, selections from a list of predefined tag options, tags having "fill in the blank" portions, and other types of tags. Tags can also include links to documents, audio, video, or any other addressable resource. A system, method and non-transitory computer-readable media are disclosed which create tag subscriptions and notify users based on tag subscriptions. A brief introductory description of a basic general purpose system or computing device in FIG. 1 which can be employed to practice the concepts is disclosed herein. Then the disclosure turns to an exemplary tagging, subscription, and notification system configuration, followed by a discussion of exemplary user interfaces for establishing a tag subscription and receiving a tag notification. Finally, the disclosure discusses three exemplary method embodiments. Numerous variations are discussed herein as the various embodiments are set forth. The disclosure now turns to FIG. 1.

Figure 1:
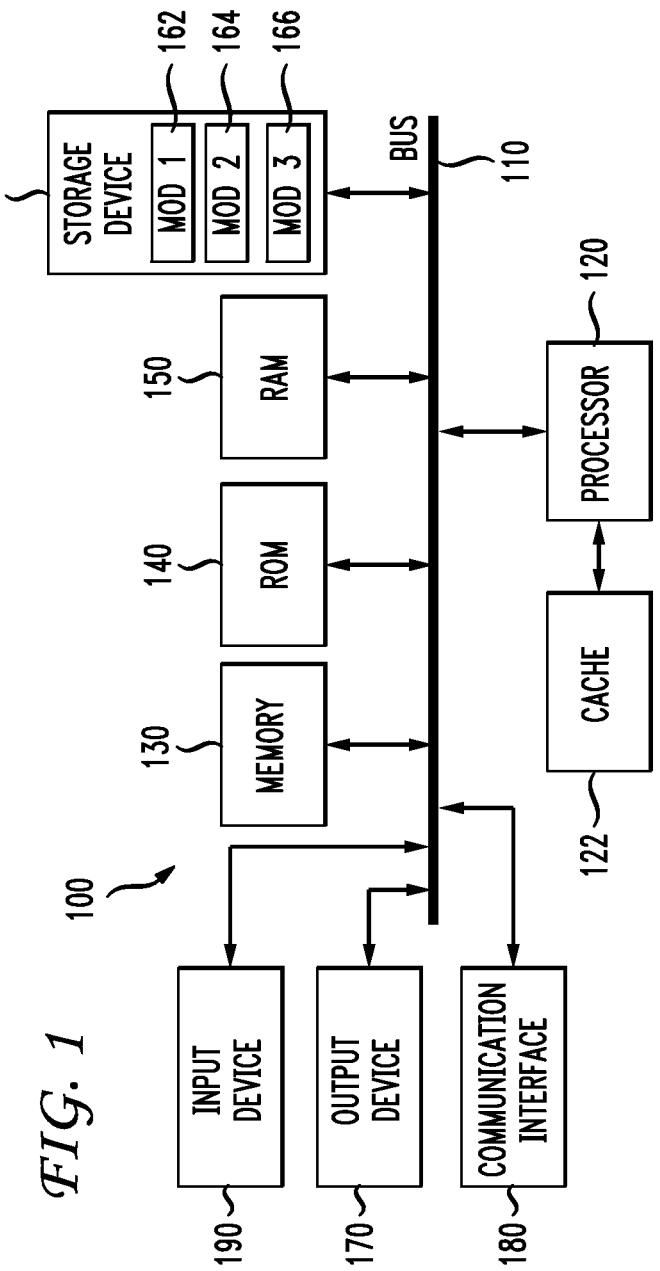
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
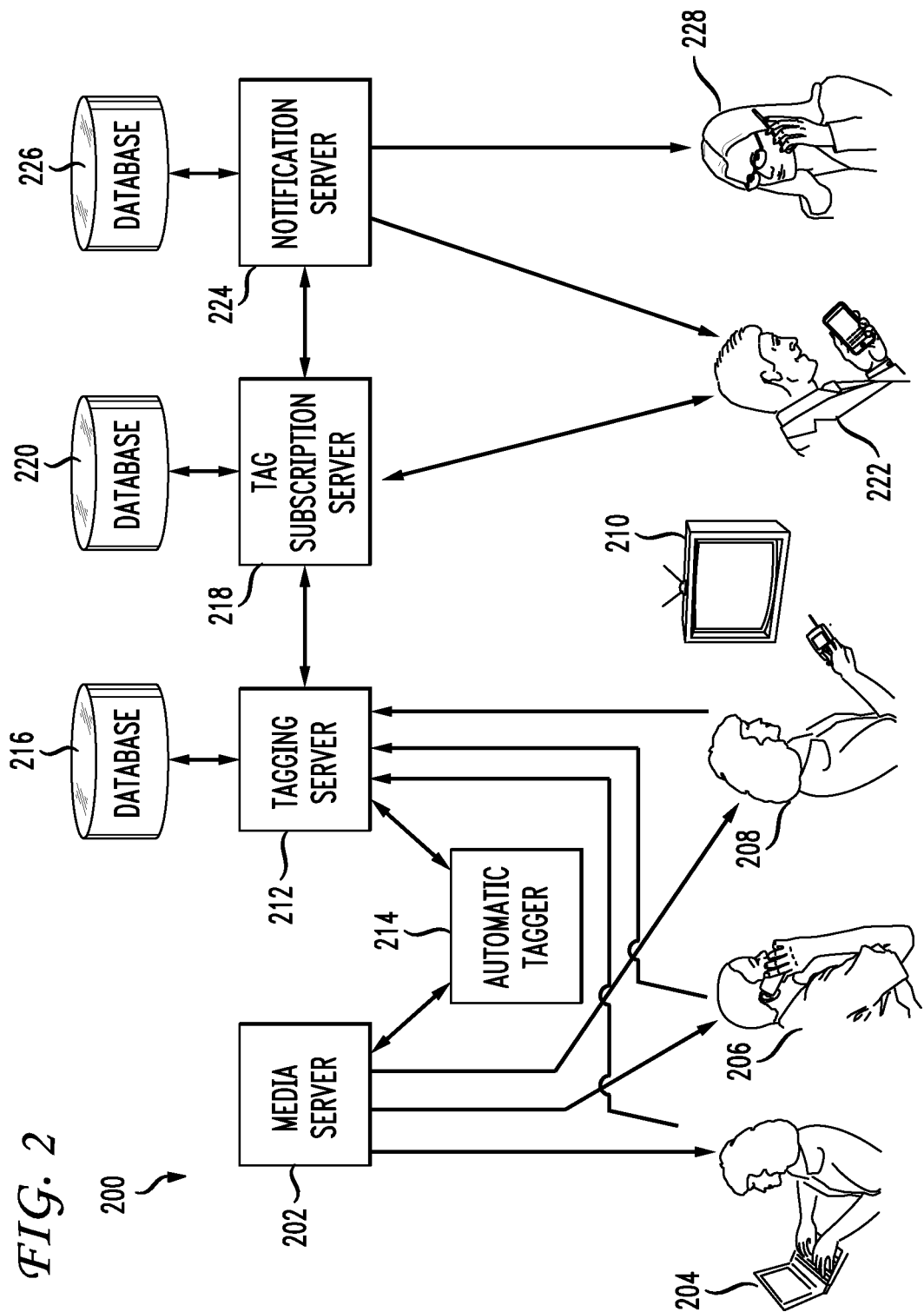
FIG. 2 illustrates an example tagging, subscription, and notification system configuration.

Having disclosed some basic system components, the disclosure now turns to a discussion of an example tagging, subscription, and notification system configuration 200 as shown in FIG. 2. In this configuration, a media server 202 serves a media event to multiple users 204, 206, 208. However, the media event can be a live event, such as a sporting event, that does not require a media server 202 for live participants, such as the audience in a stadium hosting the sporting event or a live audience of a variety show. The media server 202 can serve the media event to user devices such as television, telephone, smartphone, computer, digital video recorders, and so forth. The media server 202 can deliver the media event via physical media (such as CD or DVD), analog or digital radio broadcast, IP (such as unicast, multicast, anycast, broadcast, geocast, etc.), cable or satellite transmission, and other media delivery approaches.

As users 204, 206, 208 participate in, view, or listen to the media event, the users can provide tags describing the media event. The number of users can be as few as one and can range to hundreds, thousands, or millions, depending on the media event and its audience. For example, if the media event is a sitcom, millions of viewers may be watching (participating) simultaneously. Viewers can tag the sitcom with tags such as "funny joke", "she's going to be really angry", or "theme music". Viewers can provide tags in the form of text, speech, video, images, emoticons, sounds, feelings, gestures, instructions, links, files, indications of yes, no, or maybe, symbols, characters, other forms, and combinations thereof. These tags are delivered to a tagging server 212 and stored in a database 216. The tags can describe events, persons, objects, dialog, music, or any other aspect of the media event. The tags can further be objective or subjective based on the user's views, feelings, opinions, and reactions to the media event.

In one aspect, the media server 202 delivers the media event to one user device 210, such as a television, and the user tags the media event with another device, such as a remote control, smartphone, or a computing tablet. In another aspect, the user tags the media event using the same device that is receiving the media event, such as a personal computer. The tagging server 212 can also store tag metadata in the database 216. Tag metadata describes additional information about the tag, such as which user provided the tag, what portion of the media event the tag applies to, when the tag was created, the location of the user providing the tag, a tag type, the fact that the tag was human-generated, and so forth. The metadata can describe the creation time for tags created during a real time media event or during playback of a recorded media event. Users can tag previous portions of a live event such that the metadata includes, for example, a timestamp for whole tags which are attached to the entire media event.

The media server 202 can transmit all or part of the media event to an automatic tagger 214. The automatic tagger 214 is a computing device or other system that automatically monitors the media event for particular trigger conditions. When the automatic tagger 214 finds the trigger conditions, the automatic tagger 214 generates a corresponding tag and sends it to the tagging server 212. The trigger conditions can be simple or complex. Some example simple trigger conditions include the beginning of a media event, the ending of a media event, parsing of subtitles to identify key words, and so forth. Some example complex trigger conditions include detecting speaker changes, detecting scene changes, detecting commercials, detecting a goal in a soccer game, identifying a song playing in the background, and so forth. The automatic tagger 214 can process one or more media events. The automatic tagger 214 can also provide tag metadata to the tagging server 212, such as metadata indicating that the tag was automatically generated.

A tag subscription server 218 receives a tag subscription request from a user 222 to establish a tag subscription. The request can include one or more tag to subscribe to, one or more media event (which can include recurring media events such as a sports season, television series, or series of press conferences), and a notification threshold. The tag subscription server 218 stores the request in a database 220. The tag subscription server 218 monitors the tagging server 212 based on the tag subscription from the user 222. If the tag subscription server 218 determines that the subscription matches incoming tags to the tagging server 212, the tag subscription server 218 triggers the notification server 224 to send a notification based on the tag subscription. The notification server 224 can store a history of sent notifications in a database 226.

The tag subscription request can include notification frequency preferences, such as periodic notification (daily or weekly for example), real time notification as the media event occurs, or notification immediately or shortly after the end of the media event. The request can include one or more preferred notification modality, such as text message, email, popup message, phone call, fax, publication on the web, a synthetic voice, a video overlay, instant message, and so forth. The preferred notification modality can include a preference hierarchy. For example, the user may first prefer a phone-based notification, but if the user is unavailable by phone, the user then prefers an instant message notification, and if the user is unavailable by instant message, then the user prefers a text message notification. Similarly, the user can indicate that notifications be sent via multiple modalities simultaneously. For example, the notification server 224 can provide notifications via email and text message at the same time. Further, the notification server 224 can notify the user 222 who requested the tag subscription, other users 228, or a combination of both 222, 228. The notifications can provide additional information about the tag subscription, the conditions that triggered the notification, the media event, the underlying tags that triggered the notification, and so forth.

In one embodiment, the notification includes an option to join the media event, browse or playback the segment to which the tag was applied. For example, if the media event is a soccer match, the user having subscribed to the tag "goal" can receive notifications of the tag in real time and can join the event, watch the immediate aftermath, replay the goal, or browse through relevant segments of the match tagged with "goal". In another example, the system can notify Mary of a tag "Avaya" that Mike applied to an ongoing conference call and she will be able to quickly join the call.

Further, the notification server 224 can send notifications to applications or software modules. Upon receiving a notification, the application can perform certain actions. For example, on receiving the notification of a tag "Nike" in real time, the application can overlay the media event with advertisements relating to footwear and clothing. In a contact center, many tags expressing negative emotions can trigger a subscribing application to contact a supervisor to be bridged into the call.

The user 222 establishing the tag subscription can actively participate or not participate at all in tagging the media event to which the tag subscription server 218 applies the tag subscription. The tagging server 212, the media server 202, the automatic tagger 214, the tag subscription server 218, and/or the notification server 224 can be wholly or partially integrated or can be entirely separate systems.

The disclosure now turns to a discussion of an example tag subscription request form 300 as shown in FIG. 3. A user 222 can submit a tag subscription request to the tag subscription server 218 in many ways. The form 300 shown is a non-limiting example. Users can submit tag subscription requests via a natural language dialog with an automatic dialog system, via a web interface, via text message, via a call to a human agent, and so forth. In this example form 300, the user can enter tags to subscribe to 302, such as "Will it float", "goal", "George's presentation", "funny", and "World Cup Spain". The user can select media events to subscribe to 304. The selected media events can be one time events, such as a conference call or a boxing match, or can be recurring events, such as a television series, sports season, weekly reporting meeting, religious services, and so forth. The user then indicates who will receive the notifications 306. FIG. 3 shows a phone number and an email address for receiving notifications. The user can indicate one or more recipients in one or more notification modalities. The notification modality can guide the amount and type of information presented in the notifications. The user can also indicate when to provide notifications 308, 310. Exemplary options include in real time 308 and periodically 310. The periodically option 310 can include a pull-down menu or other user interface element to indicate how periodically, such as daily, hourly, weekly, monthly, every third Wednesday, or on some other user-specified period.

The user can indicate a threshold for notification 312. The threshold can be based on a fixed number of tags, a proportion of tags, a temporal window of tags, a closeness of a fuzzy match of tags, a signal to noise ratio between the matched tags and other tags, and/or some other attribute 314. The user can indicate a preference for fuzzy matches 316 for tags. The user can indicate specific fuzzy match patterns with wildcards or other operators, or the system can automatically determine how to apply fuzzy matches to tags. One example application of fuzzy matches is to allow misspelled tags to match a proper spelling. Finally, the user can click a submit button 318 to submit the tag subscription request to the tag subscription server 218. In one embodiment, the tag subscription server 218 provides an acknowledgement to the user that the tag subscription request was received. The acknowledgement can include an estimated timeline for when the tag subscription is to be applied, as well as an estimated cost, if any.

Figure 4:
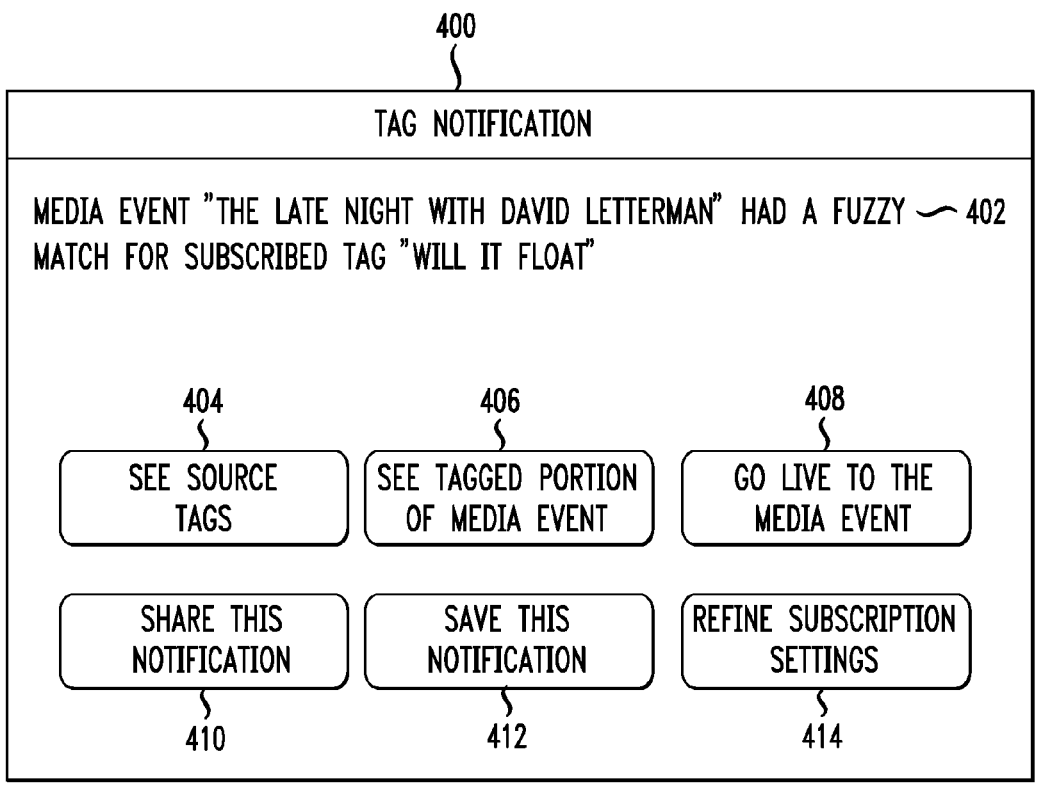
FIG. 4 illustrates an example tag subscription notification.

FIG. 4 illustrates an example of a tag subscription notification 400 that the tag subscription server 218 causes the notification server 224 to send to the appropriate users or applications. The notification 400 can be a text message, a popup window, a sound, a summary tag, a phone call, an email, and/or other form of communication. The notification in this example includes a body of notification text 402 that references the media event, the matched tag, and how the matched tag satisfied the subscription request. The notification 400 can also include metadata and other useful information. For example, the notification 400 can indicate when the next scheduled notification is due, or relevant metadata from the matched tags that triggered the notification. The notification 400 can provide the user with additional options for further interaction. For example, the notification 400 can allow the user to see source tags 404, see the tagged portion of the media event 406, go live to the media event in progress 408, share the notification 410 (such as via email or a social networking site), save the notification 412, or refine subscription settings 414. The option to refine subscription settings 414 can allow a user to update the sensitivity of the tag matching, the frequency of notification, the notification modality, notification recipients, cancel the notification, or change any other aspect of the tag subscription. The notification 400 can provide controls to navigate to relevant portions of the media event.

Figure 5:
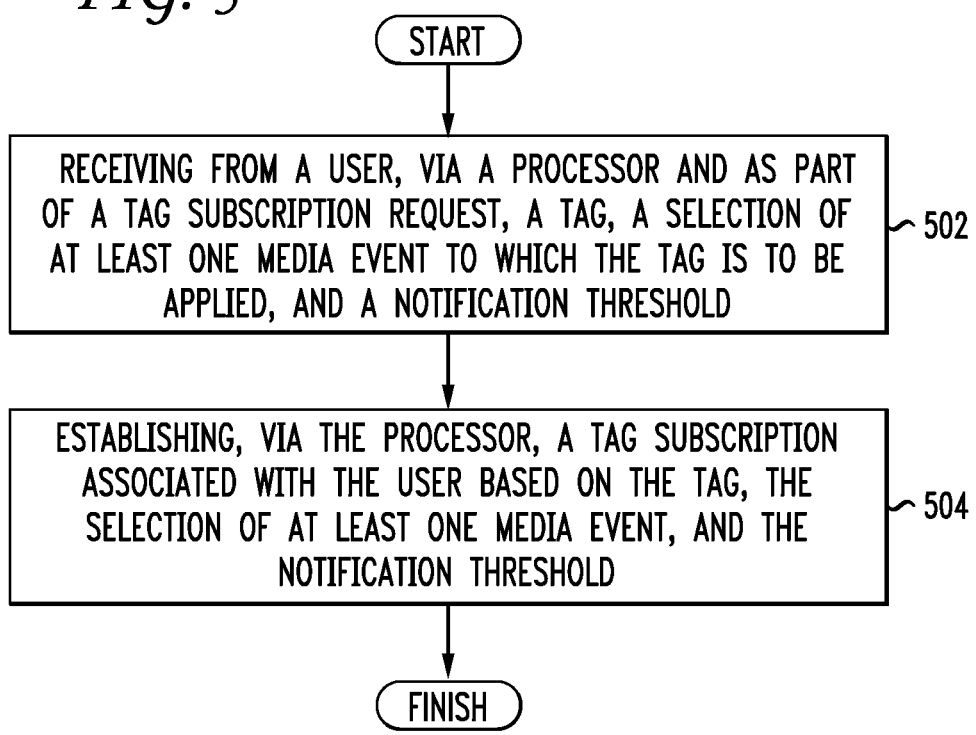
FIG. 5 illustrates an example method embodiment for establishing a tag subscription.
Figure 6:
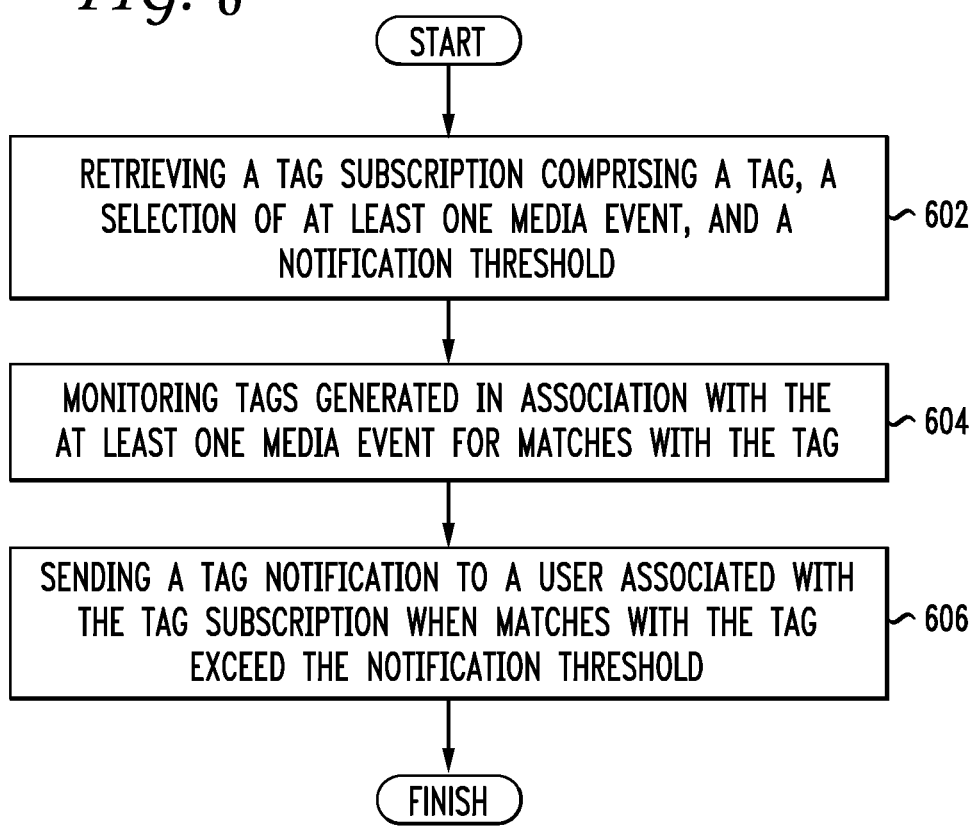
FIG. 6 illustrates an example method embodiment for notifying a user based on a tag subscription.

Having disclosed some basic system components and tag subscription and notification concepts, the disclosure now turns to the exemplary method embodiments shown in FIGS. 5-7. For the sake of clarity, the methods are discussed in terms of an exemplary system 100 as shown in FIG. 1 configured to practice the method.

FIG. 5 illustrates an example method embodiment for establishing a tag subscription. The system 100 receives from a user, as part of a tag subscription request, a tag or a list of tags, a selection of at least one media event to which one or more tag is to be applied, and a notification threshold (502). The user can include in the tag subscription request additional parameters associated with the tag subscription, such as a notification frequency, a notification modality, a duration for the tag subscription (i.e. how long will the subscription be operative), and third parties to whom the system 100 sends notifications. The media event can be presented in real time or prerecorded. The media event can be a single event, a group of single events, or a recurring series of events. In one aspect, the media event is a subset of a larger media event. For example, the media event can be a single presentation in a larger event including multiple presentations.

The system 100 establishes a tag subscription associated with the user based on the tag, the selected media event, and the notification threshold (504). The system 100 can use the tag subscription to notify the user when enough tags associated with the media event match the tag to satisfy the notification threshold. As discussed above, fuzzy matches and/or literal matches can be used to satisfy the notification threshold. The threshold can be cumulative or the system can apply the threshold to tags of the media event within a sliding temporal window.

Some example subscriptions include "anything that John tags 'fun'", "whenever Tim talks", "someone indicates that Fred has not been, but should be, brought up here", "negative opinions", "action items", "questions", "presentation of a certain slide deck", "discussion of a presentation I was a part of", and so forth. The subscriptions can involve non-textual elements as well, such as colors, sounds, symbols, emoticons, and so forth. The system 100 can render notifications in real time. For example, the system 100 can display notifications in a tickertape-type display in real-time. Users can then interact with the displayed notifications to view/hear/send or join the event. The system 100 can compose an aggregation of the media event based on the notifications, such as to a short recap of the media event focused on topics or portions of the media event that are of interest, based on tag subscriptions, to a particular group or community.

FIG. 6 illustrates an example method embodiment for notifying a user based on a tag subscription. The system 100 retrieves a tag subscription including a tag, a selection of at least one media event, and a notification threshold (602). In one variation, the same user who creates the tag subscription is also the recipient of the notification, but in other variations one user creates the tag subscription and one or more other users are recipients of the notification.

The system 100 monitors tags generated in association with the at least one media event for matches with the tag (604). The tags generated in associated with the media event can originate from multiple sources, such as audience members observing a live media event, automatic taggers, people tagging a broadcast media event in real-time, people tagging a recorded media event, and so forth.

The system 100 sends a tag notification to a user associated with the tag subscription when matches with the tag exceed the notification threshold (606). The system 100 can send the tag notification to the user in real time or substantially real time. The system 100 can alternately send the notification to the user on a periodic basis or based on some other delay factor, such as a notification frequency preference. The user can specify the notification frequency preference as part of the tag subscription request or at any other time. The system 100 can compile a list of tag notifications and send the list of tag notifications to the user on a periodic basis. This approach can demand less time and attention from the user being notified. If the media event is recorded, and not real time, the system can include, as part of the tag notification, a timestamp indicating when, in relation to the recorded media event, the matching tags exceeded the notification threshold.

In one aspect, the system 100 publishes the tag notification by composing a message that includes the recorded content, a summary of the recorded content, metadata, triggering criteria, and/or other related information. The system 100 can produce a toaster-style popup notification in a similar manner to an email or RSS notification. The user can interact with, such as clicking on, a popup or other notification to plays the video, audio, or other media associated with the tag notification. The notification can include links to other information, notifications, areas in the media, other media, metadata, and so forth.

FIG. 7 illustrates an example method embodiment for establishing a tag subscription and sending a tag notification based on the tag subscription. The system 100 receives from a user, as part of a tag subscription request, a tag, a selection of at least one media event to which the tag is to be applied, and a notification threshold (702). The system 100 establishes a tag subscription associated with the user based on the tag, the selection of at least one media event, and the notification threshold (704), and monitors tags generated in association with the at least one media event for matches with the tag, based on the tag subscription (706). Then the system 100 sends a tag notification according to the tag subscription (708).

Tags can convey a wide range of information about the media event as well as the users creating the tags. The approaches set forth herein allow for real-time notification of segments of media events through tags being applied to the media event. This approach can transform live tags of an event into a resource that users and applications can subscribe to and, in real time, receive notifications connected to events or event segments related to the subscribed tags. This approach can enhance and provide more interactive aspects to current media, such as television broadcasts, business interactions, press conferences, and so forth.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to business, entertainment media, education, court proceedings, sporting events, game shows, and so forth. Those skilled in the art will readily recognize various modifications and changes that may be made to the principles described herein without following the example embodiments and applications illustrated and described herein, and without departing from the spirit and scope of the disclosure.

We claim:

1. A method comprising:
receiving, at a server and from plural communication devices of multiple users, tag subscription requests, each tag subscription request comprising a user-created tag, an identification of a media event to be monitored, and a notification threshold, wherein the tag subscription requests identify a common media event to be monitored and wherein the user-created tags in the subscriptions are different from one another;
establishing, via a processor of the server, multiple tag subscriptions associated with the multiple user communication devices based on the tag subscription requests;
receiving, via the processor, other user-created tags from plural user communication devices of members of an audience viewing the common media event;
monitoring, via the processor, for other user-created tags relating to the common media event that match the user-created tag in a selected subscription; and
based on the tag subscription, sending, via the server, a notification to a communication device of a notification recipient associated with the selected subscription when the processor determines that a number of the other user-created tags relating to the common media event that match the user-created tag in the selected subscription exceeds the notification threshold.

2. The method of claim 1, wherein the tag subscription request further comprises an additional parameter associated with the tag subscription and wherein the tag subscription request comprises one or more of a notification timeframe or the notification threshold attribute.

3. The method of claim 2, wherein the user-created tag comprises one or more of a text annotation, tweet, audio annotation, comment, selection from a list of predefined tag options, and predefined tag having a portion completed by a user communication device and wherein the additional parameter is a notification frequency.

4. The method of claim 2, wherein the user-created tag comprises one or more of text, speech, video, an image, emoticon, sound, feeling, gesture, instruction, link, file, symbol, and character and wherein the additional parameter is a notification modality.

5. The method of claim 1, wherein the notification recipient is a communication device of a third party other than the user.

6. The method of claim 1, wherein the media event is at least one of a real-time media event or a prerecorded media event, wherein the tag subscription request comprises the notification threshold, and wherein the notification threshold is one or more of a fixed number of other user-created tags, a proportion of other user-created tags, a temporal window of other user-created tags, a closeness of a fuzzy match of other user-created tags, and a signal to noise ratio between matched user-created tags.

7. The method of claim 1, wherein the tag subscription is configured to notify the user when enough tags associated with the media event match the tag to satisfy the notification threshold and wherein the notification comprises an option for the recipient communication device to see a source user-created tag, a tagged portion of the common media event, or go live to the common media event in progress.

8. A system comprising:
a processor; and
a computer-readable storage medium storing instructions which, when executed by the processor, cause the processor to perform operations comprising:
receiving, at the processor, multiple tag subscription requests from communication devices of multiple users, each tag subscription request comprising a tag, an identification of a media event explicitly selected by a corresponding user, and a notification threshold, wherein the multiple tag subscription requests identify a common media event and wherein the tags in the tag subscriptions are different from one another;
establishing, via the processor, tag subscriptions associated with the users based on the tag subscription requests;
receiving, via the processor, other user-created tags from plural user communication devices of members of an audience viewing the common media event;
monitoring, via the processor, for other user-created tags relating to the common media event that match the tag in a selected subscription, the other user-created tags having been submitted by a plurality of members of an audience viewing the common media event; and
based on the tag subscription, sending, via the processor, a tag notification to a communication device of a notification recipient associated with the selected subscription when the processor determines that a number of the user-created tags relating to the common media event that match the tag exceeds the notification threshold.

9. The system of claim 8, wherein the processor performs the monitoring in real time, and wherein the media event is a real-time media event and wherein the tag subscription request comprises one or more of a notification timeframe or the notification threshold attribute.

10. The system of claim 8, further comprising a device storing the tag subscription, wherein the user-created tag comprises one or more of a text annotation, tweet, audio annotation, comment, selection from a list of predefined tag options, and predefined tag having a portion completed by a user communication device and wherein the processor associates the tag subscription with a communication device of the subscriber.

11. The system of claim 8, wherein the user-created tag comprises one or more of text, speech, video, an image, emoticon, sound, feeling, gesture, instruction, link, file, symbol, and character and wherein the notification recipient is a communication device of a third party other than the subscriber.

12. The system of claim 8, wherein the multiple sources generate the other user-created tags, wherein the tag subscription request comprises the notification threshold, and wherein the notification threshold is one or more of a fixed number of other user-created tags, a proportion of other user-created tags, a temporal window of other user-created tags, a closeness of a fuzzy match of other user-created tags, and a signal to noise ratio between matched user-created tags.

13. The system of claim 8, the computer-readable storage medium storing additional instructions which, when executed by the processor, cause the processor to perform further operations comprising:
receiving, from an automated tagger, machine-created tags; and
monitoring for machine-created tags that match the tag.

14. The system of claim 8, wherein the processor matches the user-created tags with the tag based on fuzzy matching, wherein the tag subscription request comprises the notification threshold attribute, and wherein the notification threshold attribute is one or more of a fixed number of other user-created tags, a proportion of other user-created tags, a temporal window of other user-created tags, a closeness of a fuzzy match of other user-created tags, and a signal to noise ratio between matched user-created tags.

15. The system of claim 8, wherein the processor sends the tag notification to the communication device of the notification recipient in real time and wherein the notification comprises an option for the recipient communication device to see a source user-created tag, a tagged portion of the common media event, or go live to the common media event in progress.

16. The system of claim 8, wherein the computer-readable storage medium stores additional instructions which, when executed by the processor, cause the processor to perform further operations comprising compiling a list of tag notifications and sending the list to the subscriber on a periodic basis.

17. The system of claim 16, wherein the processor sends the list based on a notification frequency preference in the tag subscription.

18. The system of claim 8, wherein monitoring for the user-created tags comprises monitoring the user-created tags associated with a recorded media event and wherein the tag subscription request comprises one or more of a notification timeframe or the notification threshold attribute.

19. The system of claim 18, wherein the tag notification comprises a timestamp indicating when, in relation to the recorded media event, the number of the user-created tags matching the tag exceeded the notification threshold.

\* \* \* \* \*